US007568236B2

(12) United States Patent
Gbadegesin et al.

(10) Patent No.: US 7,568,236 B2
(45) Date of Patent: Jul. 28, 2009

(54) METHODS AND SYSTEMS OF MANAGING CONCURRENT ACCESS TO MULTIPLE RESOURCES

(75) Inventors: Abolade Gbadegesin, Seattle, WA (US); David G. Thaler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 11/096,595

(22) Filed: Mar. 31, 2005

(65) Prior Publication Data
US 2005/0172156 A1 Aug. 4, 2005

Related U.S. Application Data

(62) Division of application No. 09/946,659, filed on Sep. 5, 2001, now Pat. No. 7,257,815.

(51) Int. Cl.
*G06F 17/30* (2006.01)
(52) U.S. Cl. ......................... 726/27; 709/225
(58) Field of Classification Search ................. 713/150, 713/151, 153, 154, 168; 726/1–4, 8, 27; 709/224–226
See application file for complete search history.

(56) References Cited

U.S. PATENT DOCUMENTS

| 6,047,307 | A | 4/2000 | Radko |
| 6,282,561 | B1 | 8/2001 | Jones et al. |
| 6,363,426 | B1 | 3/2002 | Yon et al. |
| 6,609,198 | B1 * | 8/2003 | Wood et al. ................. 713/155 |
| 2003/0028642 | A1 | 2/2003 | Agarwal et al. |
| 2003/0046397 | A1 * | 3/2003 | Trace et al. ................. 709/227 |
| 2003/0046576 | A1 | 3/2003 | High, Jr. et al. |

OTHER PUBLICATIONS

Microsoft Windows NT Server, "Virtual Private Networking (VPN) Security (White Paper)," Jan. 5, 1999; retrieved from http://www.microsoft.com/NTServer/commserv/deployment/planguides/VPNSecurity.asp, pp. 1-2.
Microsoft Windows 2000 Server, "Virtual Private Networking: An Overview White Paper," pp. 1-24, © 1999 Microsoft Corporation.
Blumsack.com Thesis; "Internet Protocol Version 6 and the Future of Home Networking," retrieved from http://home.rochester.rr.com/blumsack/Thesispage.htm pp. 1-10, Jan. 2000.

* cited by examiner

*Primary Examiner*—Beemnet W Dada

(57) ABSTRACT

For a method and system for managing concurrent access to multiple resources, resources are assigned to sets in such a way that it is safe to concurrently access any combination of resources in a resource set. For each resource set, a virtual machine is defined and associated with the resource set. An application is assigned to a virtual machine. When an application requests access to a resource not in the application's virtual machine, access control lists are consulted to determine whether the access should be allowed, given the other resources already accessed by the application.

10 Claims, 10 Drawing Sheets

METHODS AND SYSTEMS OF MANAGING CONCURRENT ACCESS TO MULTIPLE RESOURCES

This application is a divisional of a co-pending U.S. patent application Ser. No. 09/946,659, filed Sep. 5, 2001, and entitled "METHODS AND SYSTEMS OF MANAGING CONCURRENT ACCESS TO MULTIPLE RESOURCES".

TECHNICAL FIELD

This invention is related in general to the art of managing access to multiple resources, and, more particularly, to a method of managing concurrent access to multiple resources.

BACKGROUND OF THE INVENTION

Restricting network access to only authenticated users protects confidential information on the network from being compromised. Restricting access using common user authentication techniques, however, does not address network integrity issues in situations when a computer connects to more than one network. FIG. 1 shows a typical setup of a computer 100 connected to a private corporate network 141 via an Ethernet card 111 and to the public Internet 161 via a modem 112. An application 120 running on the computer has access to the two networks. This setup may give rise to security issues. For example, when the application concurrently accesses the two networks, the user of the application may inadvertently broadcast secure information from the private corporate network to the public Internet by mistakenly hitting a key that initiates such a broadcast. Or the user intending to send a packet to the private corporate network could unintentionally send the packet over the public Internet without proper security protection. For another example, a remote computer also connected to the Internet can access the application 120 through computer 100's Internet connection and, from there, access the private corporate network 141. Thus, because the application 120 has concurrent access to the two networks, it presents a security "hole" exploitable by remote computers.

Current operating systems do not guard against security risks such as those mentioned above. A typical operating system allows for the establishment of an insecure channel linking private and public network connections that may result in an unprivileged application accessing confidential information maintained in the private network. In conventional operating systems, it is difficult to enforce a policy forbidding an application from accessing public networks like the Internet while the application is connected to a private network. Such a policy can be defeated by a user using a phone line to connect to the Internet, which circumvents a firewall regulating access to the private network. Moreover, remote users of a private network may have no practical recourse but to use a public network like the Internet to create a Virtual Private Network (VPN) connection to the private network. But the VPN connection to the private network simultaneously connects the computer to both the secured private network and the unsecured public Internet. In a manner similar to the example given above, a remote computer also connected to the Internet can access the computer via the Internet and then access the private network via the VPN connection.

In general, an application concurrently accessing two networks creates a security breach point. Further, the computer may have access to resources other than the networks, for example, a local file system or a network printer. In these instances, similar security problems may be caused by concurrent access. For example, a user's local files may be compromised by the user mistakenly printing the files on the network printer. These examples can be generalized into a multiple, concurrent resource access problem by regarding the connection to the private network, the connection to the Internet, and the connection to the network printer as resources in a multiple-resource environment.

As shown in FIG. 1, the computer provides access to five resources, represented by R1 140, R2 113, R3 114, R4 115, and R5 160, wherein R1 is the connection to the private network, and R5 is the connection to the Internet. The possible dangers of concurrently accessing pairs of the resources are reflected in the entries in Table 1.

TABLE 1

| R1-R5: Resources 1-5 | | | | | |
|---|---|---|---|---|---|
|    | R1 | R2 | R3 | R4 | R5 |
| R1 | — | safe | safe | danger | danger |
| R2 |    | — | safe | danger | danger |
| R3 |    |    | — | danger | danger |
| R4 |    |    |    | — | safe |
| R5 |    |    |    |    | — |

According to Table 1, any combination of R1, R2, and R3 is safe, and the combination of R4 and R5 is safe. Other combinations are dangerous. Similar to the case of the application concurrently accessing the private network and the Internet, for example, it is dangerous for the application to concurrently access R3 and R4.

Thus it is desirable to have a method for managing access to multiple resources that enforces security considerations such as those in Table 1. Currently, many operating systems, applications, and hardware devices provide methods of either setting up security access to a resource or enhancing the security connection to a resource. But none of them provides a method of managing concurrent access to multiple resources.

SUMMARY OF THE INVENTION

The present invention is directed to a method and system for managing concurrent access to multiple resources. Resources are assigned to sets in such a way that it is safe to concurrently access any combination of resources in a resource set, and two resource sets are disjoint. For each resource set, a virtual machine is defined and associated with the resource set. Each running application instance is assigned to a virtual machine. When an application instance attempts a resource-access operation, the permissions of the principal that is running (or "owns") the application instance (hereafter, a "principal" refers to an entity, for example, a user or a system process, that may be given permission to perform certain operations) are compared against access control lists (ACLs). These lists specify, for each principal, whether application instances owned by the principal may perform various resource-access operations including, but not limited to: accessing a resource in the virtual machine assigned to the application instance or in another virtual machine, creating a new resource, creating a new virtual machine, and concurrently accessing a resource in another virtual machine while maintaining access to resources in the virtual machine to which the application instance is currently assigned.

In one embodiment of the invention, in response to a request from an application instance to either access or generate a resource in a resource set other than the resource set associated with the virtual machine to which the application instance is assigned, a management facility consults the access control lists to determine whether the application instance's principal has permission to perform the requested operation. If the principal has permission, the management facility enables the access. Else, the management facility rejects the request.

In an alternative embodiment of the invention, if the management facility finds that the principal has the requisite permission, the request is fulfilled by generating a new instance of the application in association with the virtual machine of the requested resource, creating that virtual machine or the new resource if appropriate.

In another alternative embodiment of the invention, when the management facility grants the request, the request is fulfilled by moving the instance of the application from the virtual machine to which it was originally assigned to a destination virtual machine associated with the requested resource. The moving of the instance of the application may involve creating a new instance of the application in the destination virtual machine, removing the instance of the application from its original virtual machine, and dropping the connection of the instance of the application on the original virtual machine to the resource set associated with the original virtual machine.

In an exemplary multiple-network environment employing the present invention, a computer connects to a private network and to the Internet. Two virtual machines are launched, each of which is associated with one network connection. Application instances are assigned to the virtual machines. Depending upon the permissions associated with their principals, some application instances may concurrently access the Internet and the private network, whereas other application instances may not concurrently access both networks.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The present invention is directed to a method and system for managing concurrent access to multiple resources. The term "resource" used in this invention can mean, for example, but is not limited to, a connection to a network, a connection to a printer, a local file system, a section of shared memory, or a software object.

Application instances are assigned to virtual machines, each of which is associated with a set of resources. Access control lists specify, for each principal, whether application instances owned by the principal can perform various resource-access operations. Specifically, an application instance is termed "unprivileged" if, by reason of its principal's permissions, it may never concurrently access resources in more than one virtual machine. A "privileged" application instance, on the other hand, may or may not be allowed such concurrent access, depending on circumstances such as the nature of the requested resources.

Although it is not required, the present invention may be implemented using instructions, such as program modules, that are executed by a computer. Generally, program modules include routines, objects, components, data structures, and the like that perform particular tasks or implement particular abstract data types. The term "program" includes one or more program modules.

The invention may be implemented on a variety of machines, including personal computers, cell phones, handheld devices, multi-processor systems, microprocessor-based programmable consumer electronics, minicomputers, mainframe computers, and the like. The invention may also be implemented in a distributed system, where tasks are performed by components that are linked through a communications network. In a distributed system, cooperating modules may be sited in both local and remote locations.

Figure 1:
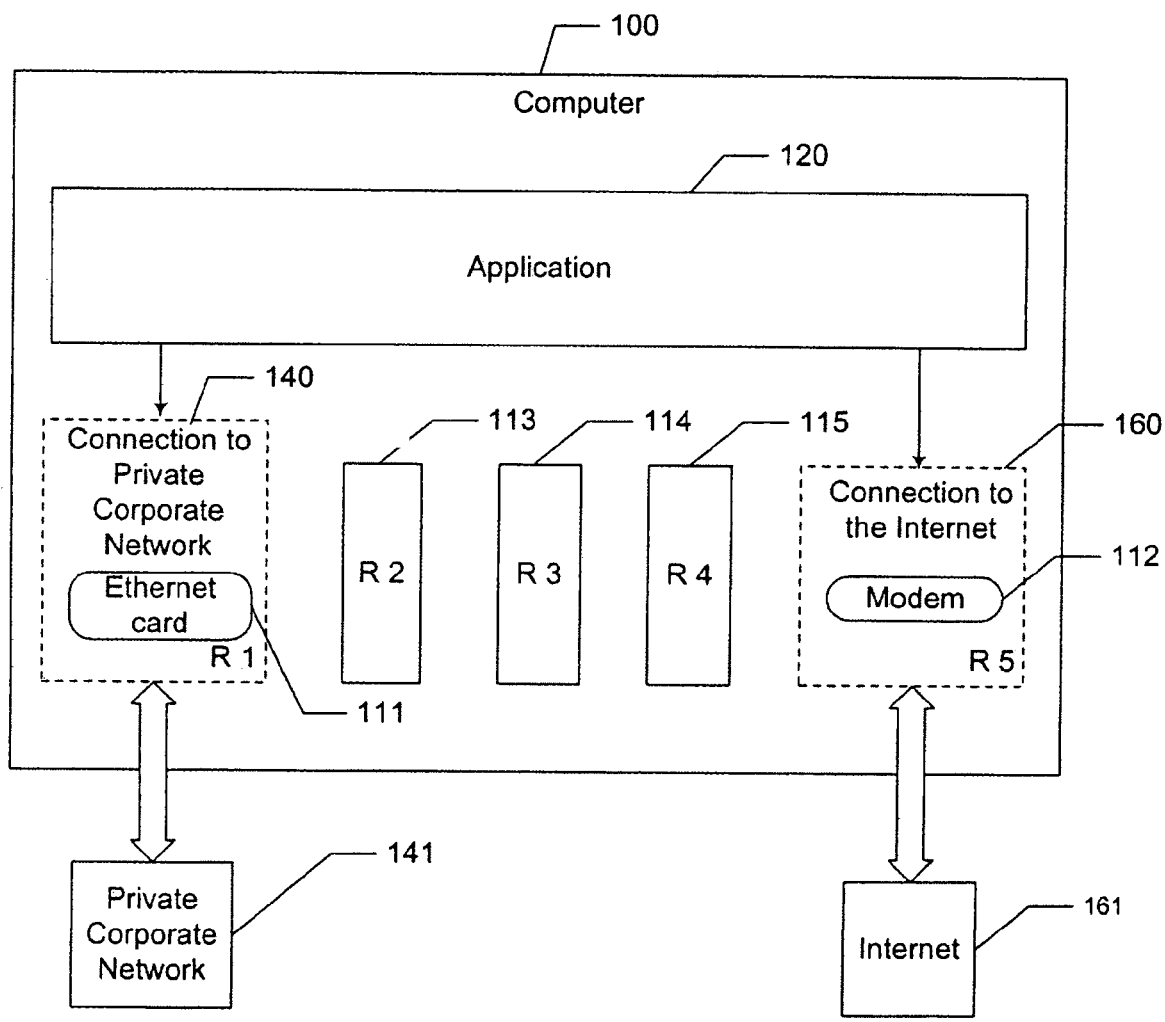
FIG. 1 illustrates a typical prior art setup of a computer connected to a private corporate network via an Ethernet card and to the public Internet via a modem.

Starting from the multiple-resource access problem illustrated in FIG. 1 and Table 1, Table 2 groups the resources with respect to the security access consequences listed in Table 1.

TABLE 2

| Resource Set A | Resource Set B |
| --- | --- |
| R1 | R4 |
| R2 | R5 |
| R3 | |

In Table 2, resources R1, R2, and R3 are grouped into resource set A because concurrent access to any combination of the three resources is safe. Resources R4 and R5 are grouped into resource set B because concurrent access to these two resources is safe.

Although the resource sets A and B in Table 2 are defined according to pair-wise combinations of resources, this is not an absolute requirement. Rather, a resource set is defined, particularly in a complex situation, to avoid dangerous combinations of any number of resources, as appropriate to the situation.

Figure 2:
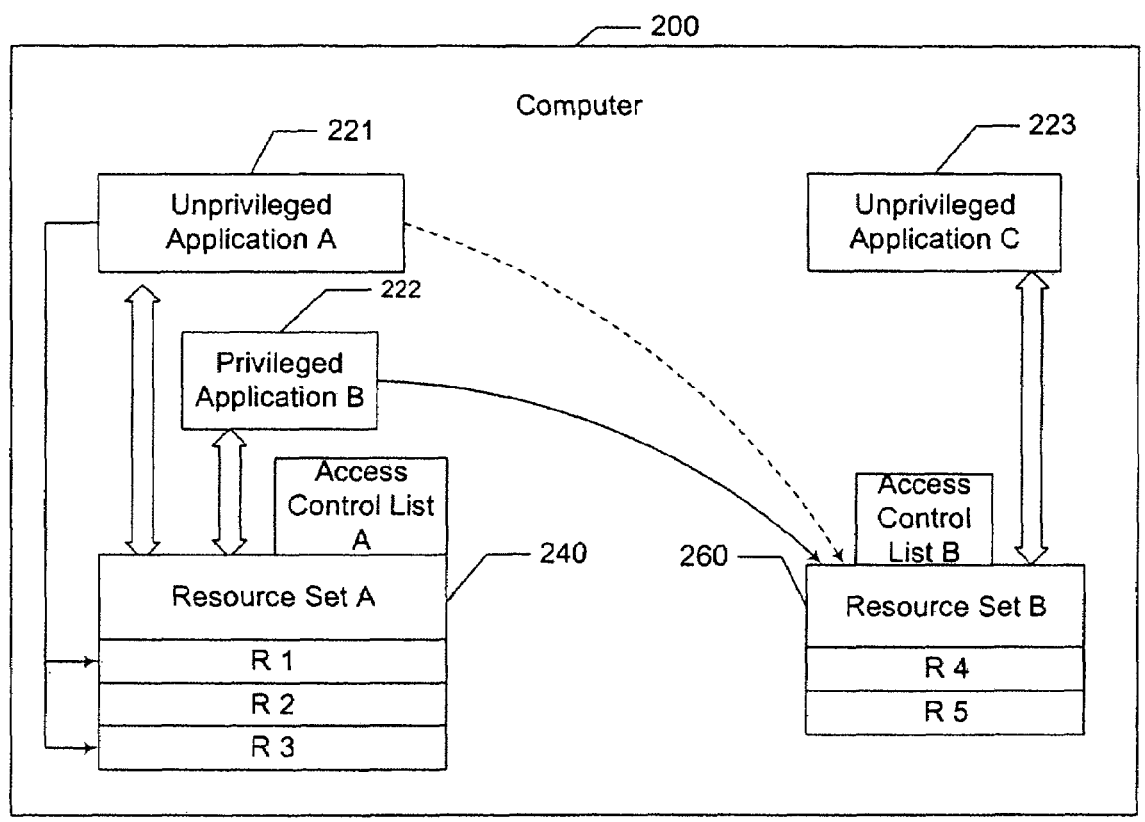
FIG. 2 illustrates methods of managing access to multiple resources according to the invention.

Referring to FIG. 2, a computer 200 provides access to resource sets A 240 and B 260. Resource set A includes resources R1, R2, and R3, while resource set B includes resources R4 and R5. An unprivileged application A 221 and a privileged application B 222 are associated with resource set A, and an unprivileged application C 223 is associated with resource set B. These associations may be defined according to the application user's preferences or may be defined by default when the applications are initialized. Each resource set is accompanied by an access control list. The per-resource-set access control lists define, for each principal, whether the principal has permission to access or create a resource in the set. An additional, system-wide, access control list defines, for each principal, whether the principal has permission to concurrently access resources in more than one resource set and to create new resource sets. The unprivileged applications A and C may not concurrently access resources in separate resource sets, whereas privileged application B may or may not be allowed to do so, as determined by comparing the permissions of application B's principal with the access control lists.

For example, assume that privileged application B has access to resource R2 in resource set A and requests concurrent access to resource R4 in resource set B. The system first determines whether application B's principal has permission to access R4. If so, the system then determines whether application B's principal has permission to concurrently access R2 and R4. If so, the concurrent access is enabled. Otherwise, the access request is rejected. If application B requests the creation of a new resource in resource set B, the system determines whether application B's principal has such permission. If so, the request is granted. Unprivileged application A may not concurrently access resources in separate resource sets even though application A's principal may have permission to access the resources individually. Similarly, application A's principal might have permission to create a new resource in resource set A (depending, as usual, on the access control lists associated with resource set A), while application A may not create a new resource in resource set B.

Figure 3:
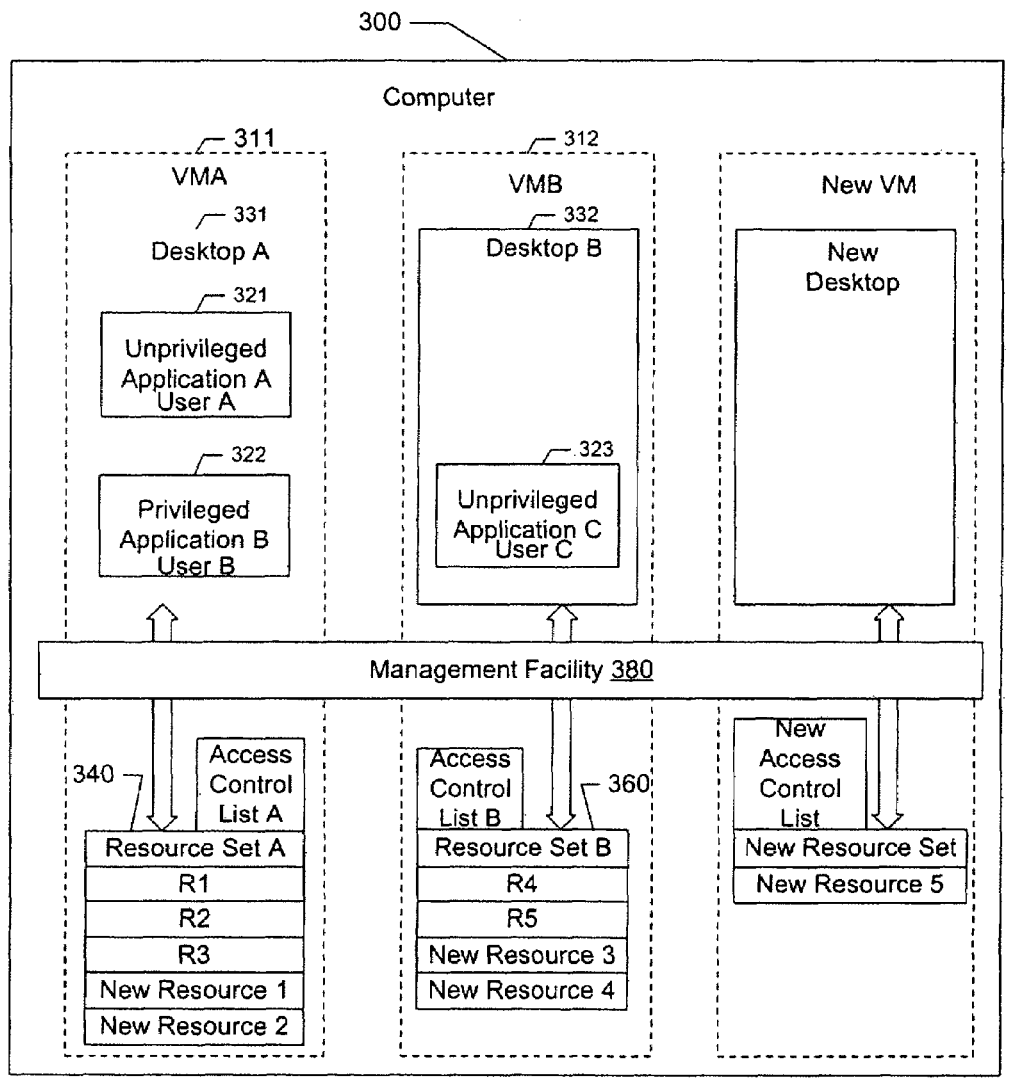
FIG. 3 is a structural diagram illustrating components of a computer employing the invention.

To practice the method illustrated with respect to FIG. 2, multiple virtual machines are launched as shown in FIG. 3. FIG. 3 illustrates components of a computer system employing one embodiment of the invention. In FIG. 3, a computer 300 originally comprises two resource sets, resource set A 340 and resource set B 360. The computer has two virtual machines, each of which is associated with one resource set. In particular, virtual machine A (VMA) 311 and virtual machine B (VMB) 312 are associated with resource set A 340 and resource set B 360, respectively. Unprivileged application A 321 and privileged application B 322 are assigned to VMA and are running on a desktop A 331 operated by VMA. A desktop represents a visual workspace that is accessed through a graphical user interface. Unprivileged application C 323 is assigned to VMB and is running on a desktop B 332 operated by VMB. Although the exemplary embodiment illustrated in FIG. 3 has a desktop for each of the virtual machines, this is not an absolute requirement. Other embodiments with a virtual machine lacking a desktop or having more than one desktop are not intended to be excluded by FIG. 3 from the scope of the invention described herein. To operate the computer and the virtual machines inside the computer, a management facility 380 is supplied. In keeping with the invention, the management facility may be an operating system of the computer or a program module. The management facility is adapted for managing the virtual machines' connections to the resources in the resource sets in such a way that applications assigned to a virtual machine may access resources.

The management facility 380 operates, in part, by comparing the permissions given to principals with various access control lists. An exemplary access control list A accompanying resource set A may specify: a) that applications run by users A, B, and C may access resource set A; b) that user A may access resources R1 and R2 in resource set A, user B may access resources R2 and R3, and user C may access resource R1; and c) that all three users may create new resources in resource set A. An exemplary access control list B accompanying resource set B may specify: a) that only users B and C may access resource set B; b) that users B and C may access all resources in resource set B; and c) that no user may create a resource in resource set B. In addition to the access control lists, the management facility also maintains a record of: a) assignment relationships between virtual machines and application instances; and b) association relationships between resource sets and virtual machines.

If after determining that the access control lists do not allow a requested resource-access operation to take place, the management facility 380 preferably denies the request. When the denial is based on a prohibition against concurrent access, the management facility may "move" the requesting application from its original virtual machine to the virtual machine associated with the newly requested resource, at the same time severing the application's connection to any resources in the original virtual machine. Alternatively, the management facility may create a new instance of the requesting application in the virtual machine of the requested resource. In all of these possibilities, the management facility honors the access control lists' rules against concurrent access because no one instance of an application has concurrent access to the newly requested resources and to the resources in the application's original virtual machine.

Figure 4:
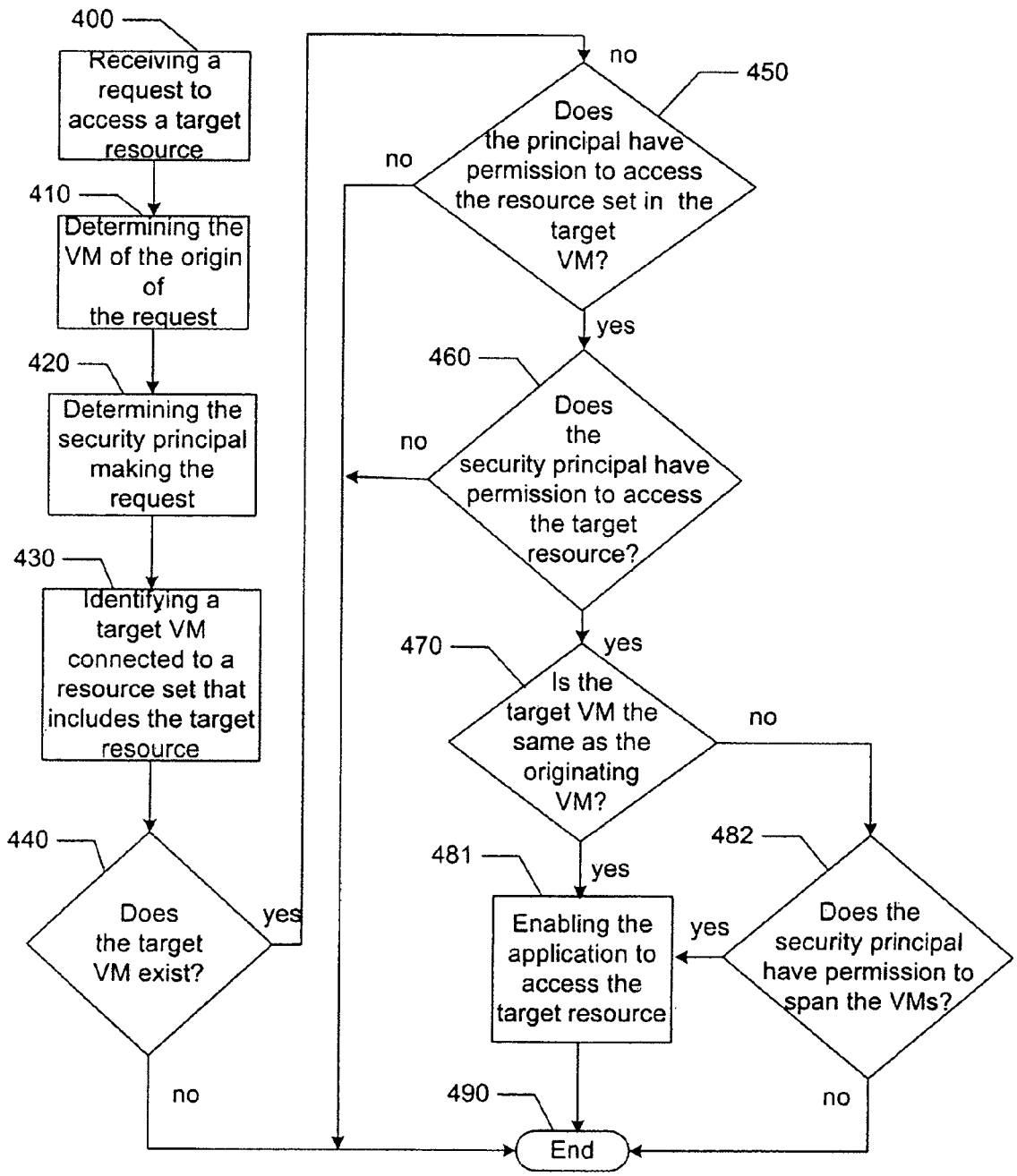
FIG. 4 is a flow chart of the steps executed in managing access to an existing resource.

FIG. 4 illustrates this procedure. It's a flow chart demonstrating the steps executed when an application in FIG. 3 requests access to an existing resource. The method starts at step 400 where the application requests access to a target resource. At step 410, the virtual machine to which the application is assigned is identified. At step 420, the system determines the permissions of the principal that owns the application instance making the request. At step 430, the management facility identifies a target virtual machine connected to a resource set that includes the target resource. At step 440, the management facility determines whether the target virtual machine exists. If not, the operation flow ends at step 490. Otherwise, the management facility determines whether the application's principal has permission to access the resource set in the target virtual machine at step 450. If not, the access request is denied, and the flow ends at step 490. Otherwise, it is determined whether the principal has permission to access the target resource at step 460. If not, the access request is rejected, and the flow ends at step 490. Otherwise, it is further determined whether the target virtual machine is the same as the originating virtual machine at step 470. If so, concurrent access permission is presumed (based on the definition of a resource set), and, at step 481, the management facility enables the access. If at step 470, the target virtual machine is different from the originating virtual machine, the flow chart branches to step 482, which asks whether the principal has permission to concurrently access resources in multiple virtual machines. If so, concurrent access is enabled at step 481. Otherwise, the concurrent access is rejected. It is in response to step 482 determining that concurrent access is not allowed that the system may optionally move the requesting application to the target virtual machine or create a new instance of the application on the target virtual machine.

Figure 5:
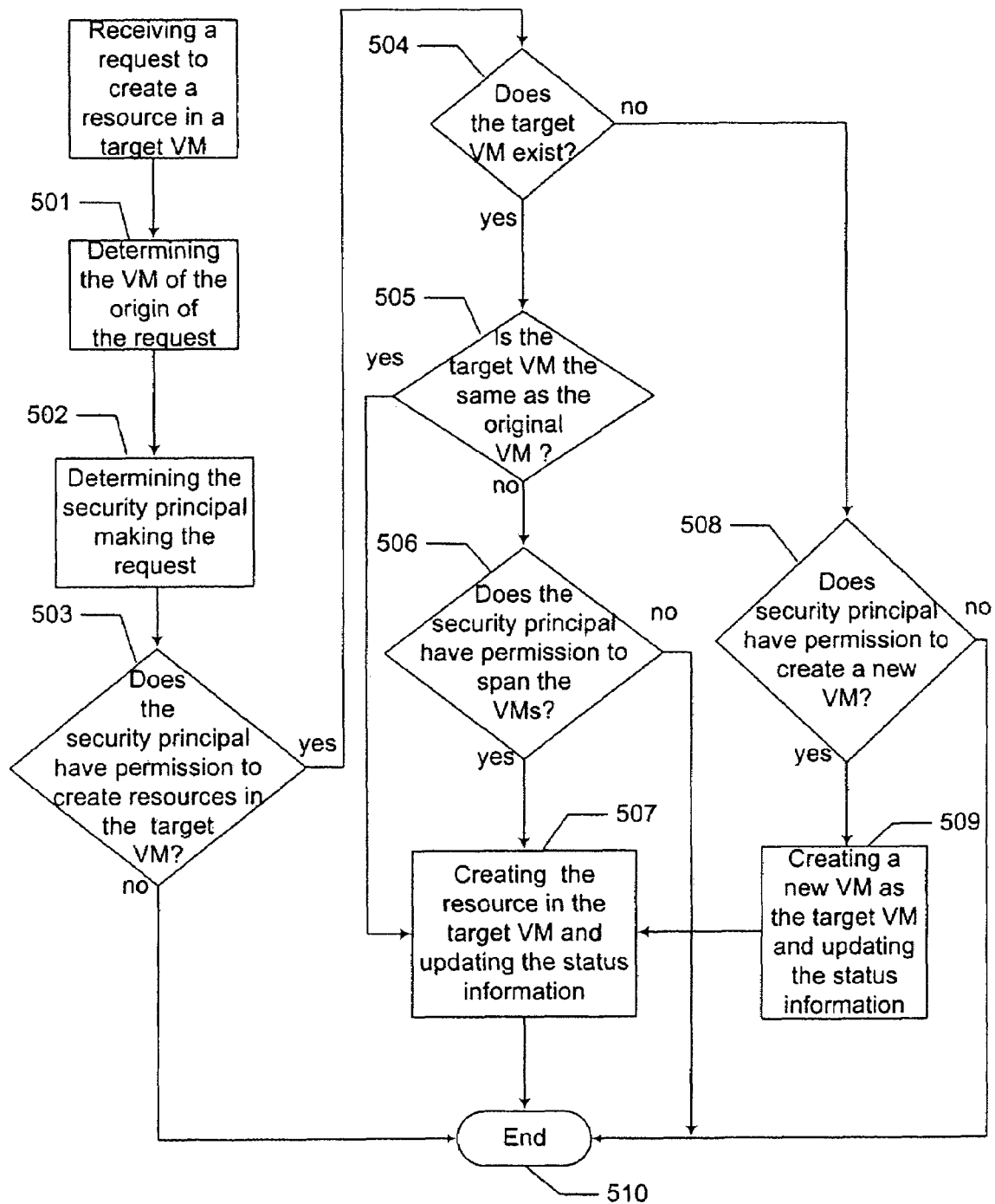
FIG. 5 is a flow chart of the steps executed in creating a resource.

FIG. 5 is a flow chart demonstrating what happens when an application instance requests the creation of a new resource. At step 500, a request to create a resource in a target virtual machine is received. Step 501 determines the virtual machine of the origin of the request. At step 502, the principal of the application instance making the request is determined. Step 503 determines whether the principal has permission to create resources in the target virtual machine. If not, the request is rejected, and the flow terminates at step 510. Otherwise, at step 504, it is determined whether the target virtual machine exists. If so, at step 505, it is further determined whether the target virtual machine is the same as the originating virtual machine. If so, the new resource is created in the target virtual machine, and the configuration and status of the computer are updated at step 507. Otherwise, at step 506, it is determined whether the principal has permission to concurrently access multiple virtual machines. If so, the operation continues at step 507, otherwise, the operation terminates at step 510. If at step 504, it is determined that the target virtual machine does not exist, at step 508, it is determined whether the principal has permission to create a new virtual machine. If so, a new virtual machine is created, and configuration of the computer is updated at step 509, which is followed by step 507 where the new resource is created in the new virtual machine. Else, the operation flow terminates at step 510.

Figure 6:
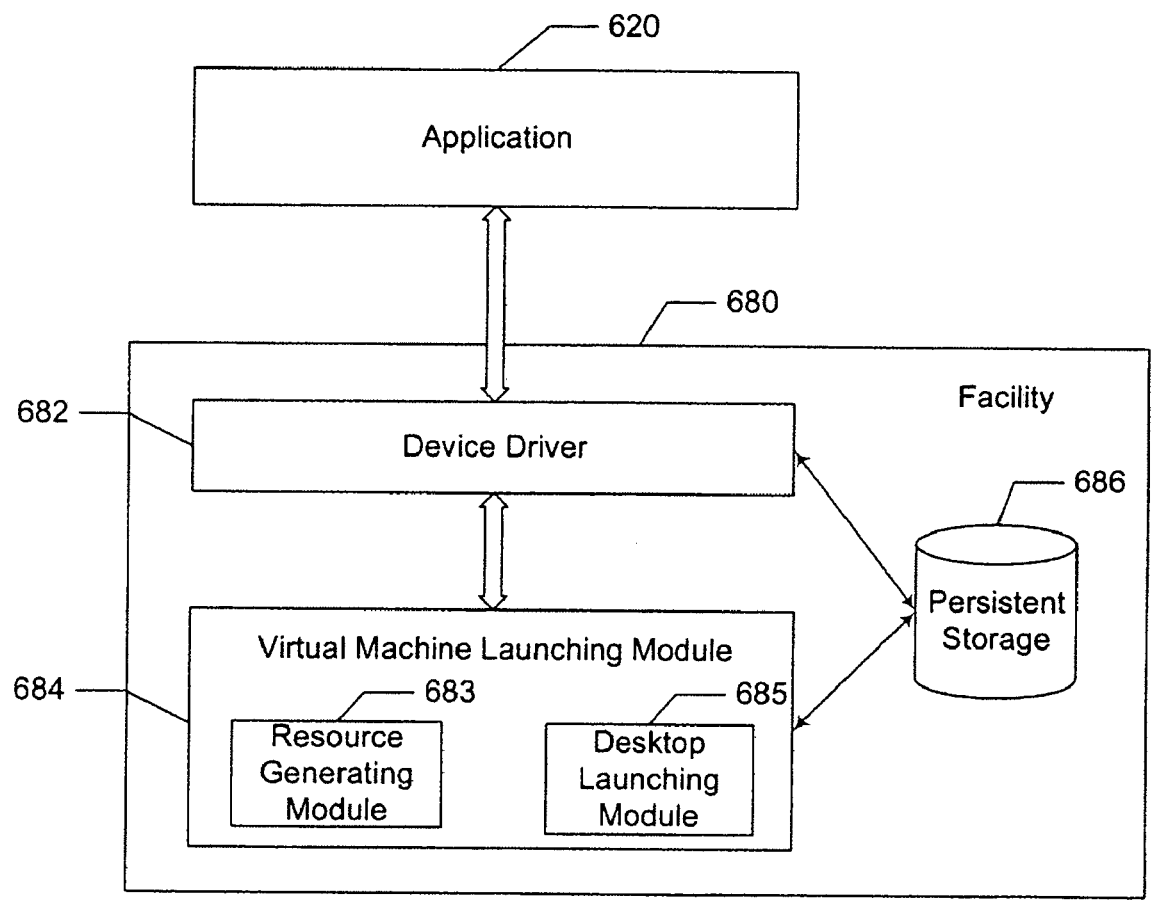
FIG. 6 illustrates components of a management facility for managing access to multiple resources according to the invention.

Referring to FIG. 6, the management facility 680 in accordance with one embodiment of the invention comprises a persistent storage 686, a device driver 682 that communicates with an application 620 and the storage 686, and a virtual machine launching module 684 connected to the storage and the device driver. The virtual machine launching module further comprises a resource generating module 683 and a desktop launching module 685. According to one embodiment of the invention, the persistent storage stores the access control lists. The virtual machine launching module is responsible for launching a new virtual machine in compliance with the stored access control lists. After launching a new virtual machine, the record of the status of the computer system is updated accordingly. The device driver manages communications and data transfer for applications with respect to the stored access control lists.

Figure 7A:
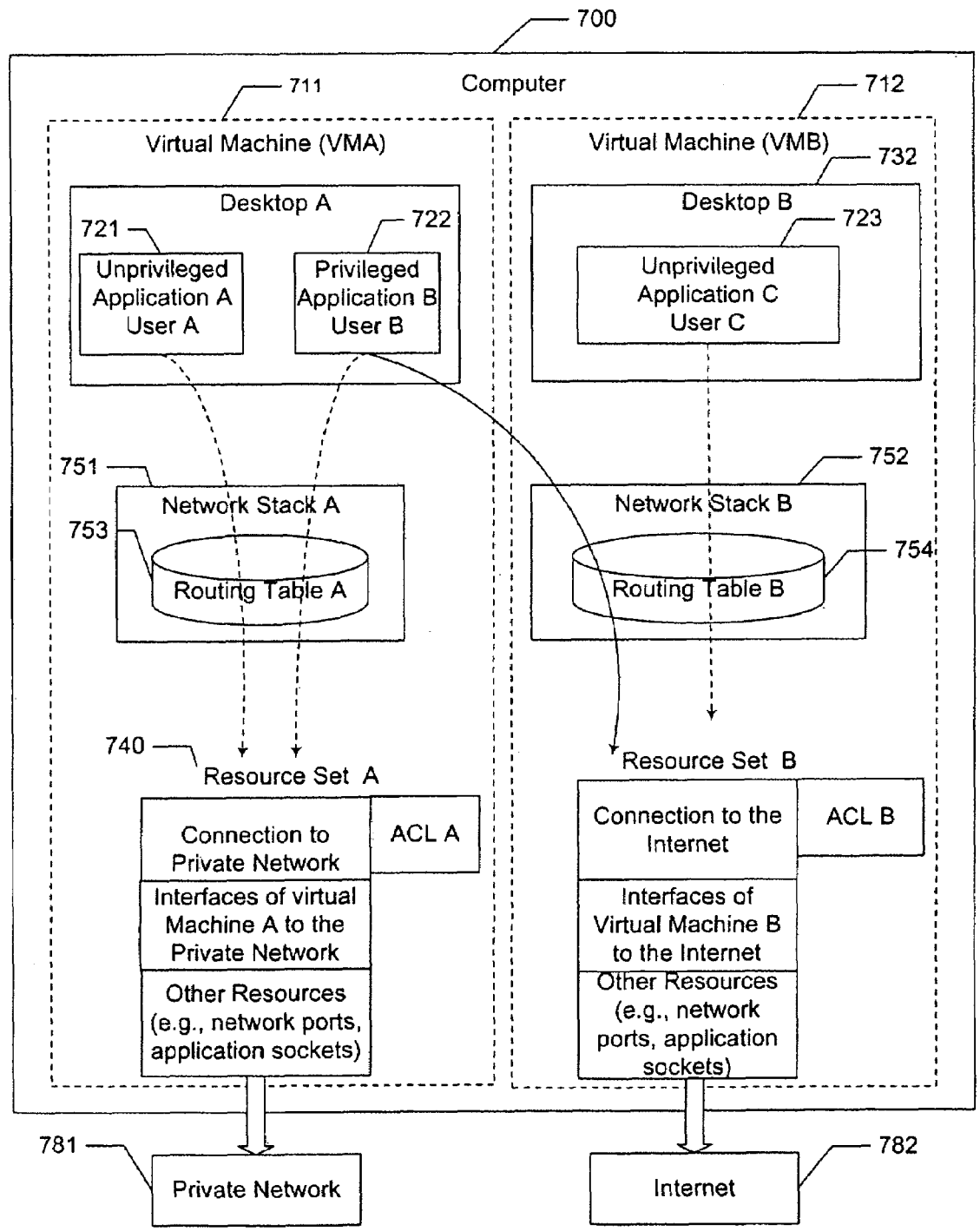
FIG. 7a, FIG. 7b, and FIG. 7c are structural schematics illustrating an exemplary environment employing the invention for managing access to multiple networks.
Figure 7B:
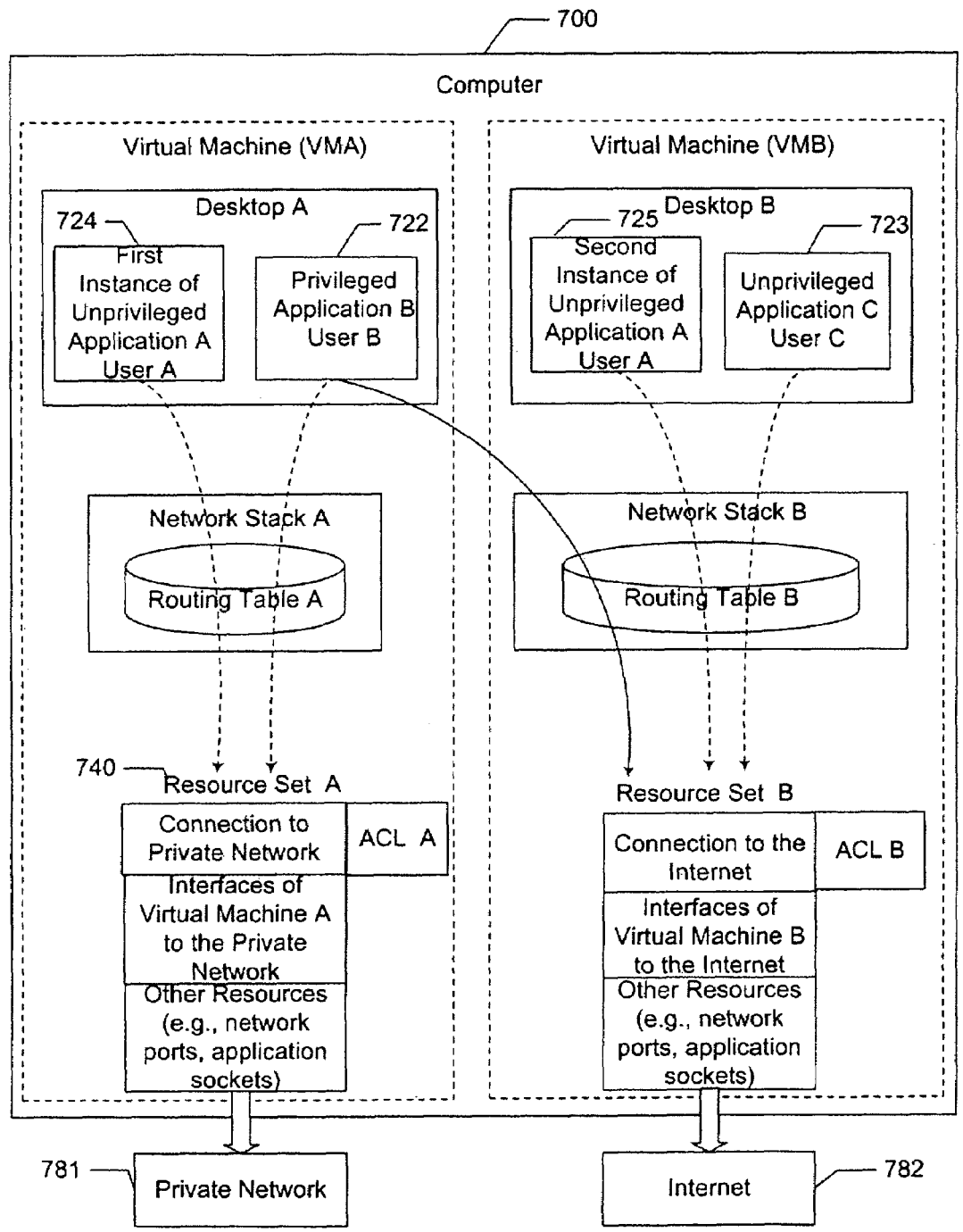
Figure 7C:
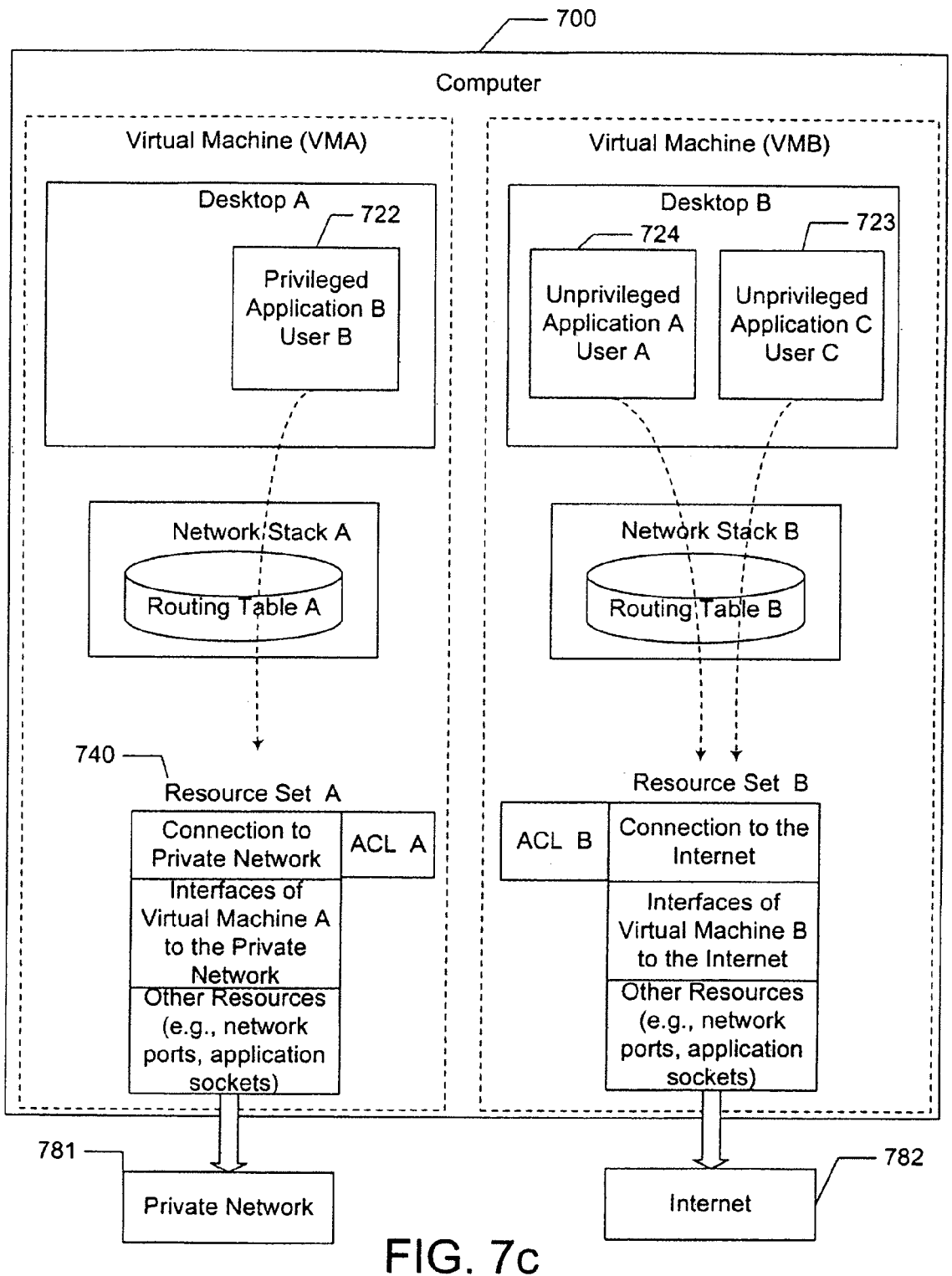

FIG. 7a, FIG. 7b, and FIG. 7c illustrate an exemplary multiple-network setup of a computer employing one embodiment of the invention. In FIG. 7a, the network environment comprises a computer 700 and two distinct networks, a private corporate network 781 and the public Internet 782. The computer comprises a first virtual machine VMA 711 and a second virtual machine VMB 712, which are similar to the virtual machines VMA and VMB in FIG. 3. Two separate virtual network stacks are provided for the two virtual machines so that the virtual machines connect to the networks separately. In particular, a first network stack A 751 comprising a first routing table A 753 is provided for the first virtual machine VMA, and connects VMA to the private network 781. A second network stack B 752 comprising a second routing table B 754 is provided for the second virtual machine VMB and connects VMB to the public Internet. In this setup, unprivileged applications on virtual machine A, for example, unprivileged application A 721, are restricted to interact with the private network only. Similarly, unprivileged application C 723 on virtual machine B may only access the public Internet. Privileged application B 722 running on virtual machine A may concurrently access the private network and the Internet. Application A interacts with the private network via sockets defined by the application. Data packets transmitted from the private network are forwarded to the virtual machine A via proper interfaces that have been associated with the applications. Similarly for application C, data packets transmitted from the Internet are forwarded to the virtual machine B via proper interfaces that have been associated with application C. In this way, unprivileged application A in virtual machine A cannot access the Internet, while unprivileged application C in virtual machine B cannot access the private network. To accomplish network communications, other resources may be required. For example, resource set A 740 further comprises network ports and interfaces of virtual machine A to the private network.

In FIGS. 7a and 7b, application A has requested access to the Internet but is not allowed concurrent access to the private network and to the Internet. In one embodiment, the request is simply denied. Alternatively, in FIG. 7b, a first instance of application A 724 is connected to the private network 781, and a second instance of application A 725 is generated in virtual machine B to enable the user of application A to access the public Internet 782. The second instance of application A is generated under the condition that user A has permission to access the Internet. As in the situation illustrated in FIG. 7a, no one instance of an unprivileged application has access to both the private network and the public Internet. As a second alternative, in FIG. 7c, unprivileged application A 724 is moved from virtual machine A to virtual machine B, which is associated with the Internet. The original instance of application A in virtual machine A is removed.

The following is an exemplary Application Programming Interface (API) usable for implementing the methods of FIG. 4 and FIG. 5. The API uses these abstract data types:

VmInfo: A compound data type that describes a virtual machine. An implementation of this abstract data type might include such information as a name, creation time, etc.

VmId: A value that identifies a single virtual machine and is unique within (at least) a single physical machine.

Function: A method that should be called in response to a particular event.

Principal: A logical entity that can make requests.

ResourceInfo: A compound data type that describes a resource (such as a network interface or a route) that exists within the context of a single virtual machine.

ResourceId: A value that identifies a single resource and is unique within (at least) a single physical machine.

Module: A logical entity that owns resources.

Status: A result code.

The methods defined by this API for managing virtual machines are as follows:

Method for creating a virtual machine: create_vm(in Principal principal, in VmInfo info, out VmId identifier, out Status status).

Method for destroying a virtual machine: destroy_vm(in Principal principal, in VmId identifier, out Status status).

Methods for obtaining information about virtual machines: get_vm_info(in Principal principal, in VmId identifier, out VmInfo info, out Status status) and get_vm_info set(in Principal principal, out "set of" VmInfo, out Status status).

Method for updating information about a virtual machine: update_vm_info(in Principal principal, in VmId identifier, in VmInfo info, out Status status).

Method for registering for change notifications: register_for_vm_change_notifications(in Module module, in Principal principal, in Function notify_vm_created, in Function notify_vm info_updated, in Function notify_vm_to_be_destroyed, out Status status).

Method for notification of VM creation: notify_vm_created(in VmId identifier, in VmInfo info).

Method for notification of VM information change: notify_vm_info_updated(in VmId identifier, in VmInfo info).

Method for notification of VM destruction: notify_vm_to_be_destroyed(in VmId identifier).

Methods for managing a module's per-virtual machine resources: create_resource(in Principal principal, in VmId origin_virtual_machine, in VmId destination_virtual_machine, in ResourceInfo info, out ResourceId identifier, out Status status) and access_resource(in Principal principal, in VmId origin_virtual_machine, in VmId destination_virtual_machine, in ResourceId identifier, out Status status).

Figure 8:
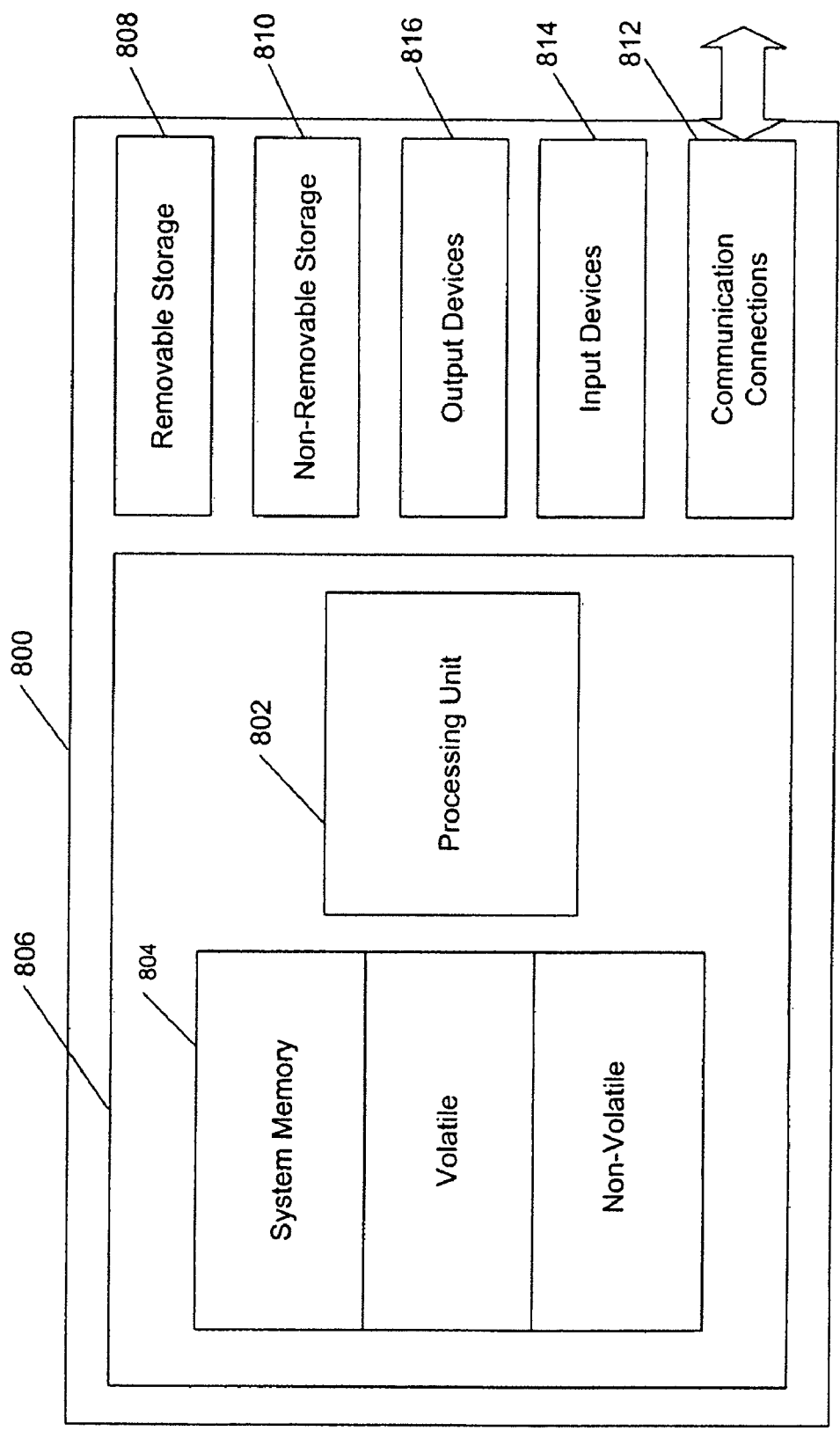
FIG. 8 is a simplified schematic illustrating a computing device architecture employed by a computing device upon which an embodiment of the invention may be executed.

With reference to FIG. 8, one exemplary system for implementing embodiments of the invention includes a computing device, such as computing device 800. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.), or some combination of the two. This most basic configuration is illustrated in FIG. 8 by dashed line 806. Additionally, device 800 may also have additional features and functionality. For example, device 800 may also include additional storage (removable or non-removable) including, but not limited to, magnetic or optical disks or tape. Such additional storage is illustrated in FIG. 8 by removable storage 808 and non-removable storage 810. Computer storage media include volatile and nonvolatile, removable and non-removable media implemented in any method or technology for storage of information such as computer-readable instructions, data structures, program modules, or other data. Memory 804, removable storage 808, and non-removable storage 810 are all examples of computer storage media. Computer storage media include, but are not limited to, RAM, ROM, EEPROM, flash memory, or other memory technology, CD-ROM, digital versatile disks, or other optical storage, magnetic cassettes, magnetic tape, magnetic disk storage, or other magnetic storage devices, or any other medium which can be used to store the desired information and which can accessed by device 800. Any such computer storage media may be part of device 800.

Device 800 may also contain one or more communications connections 812 that allow the device to communicate with other devices. Communications connections 812 are an example of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media such as a wired network or direct-wired connection and wireless media such as acoustic, RF, infrared, and other wireless media. As discussed above, the term computer-readable media as used herein includes both storage media and communications media.

Device 800 may also have one or more input devices 814 such as a keyboard, mouse, pen, voice input device, touch input device, etc. One or more output devices 816 such as a display, speakers, printer, etc., may also be included. All these devices are well known in the art and need not be discussed at greater length here.

It will be appreciated by those of skill in the art that a new and useful method and system for managing access to multiple resources has been described herein. In view of the many possible embodiments to which the principles of this invention may be applied, however, it should be recognized that the embodiments described herein with respect to the drawing figures are meant to be illustrative only and should not be taken as limiting the scope of invention. Those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method operable in a computer system having access to a plurality of networks, for managing an application instance's concurrent access to the networks, the method comprising:

associating a first instance of the application with a first network;

upon receiving a request from the first instance of the application to access a second network, checking whether the application has permission to access the second network, the checking based, at least in part, on the safety of concurrent access to the first network and the second network;

informing the application of the result of the permission checking;

associating a first routing table with the first network;

defining a first set of interfaces, through which the first instance of the application exchanges a plurality of data packets with the first network;

associating the first set of interfaces with the first network; and associating a first virtual network stack with the first network for managing the data packets transferred between the first network and the first set of interfaces.

2. A method operable in a computer system having access to a plurality of networks, for managing an application instance's concurrent access to the networks, the method comprising:

associating a first instance of the application with a first network;

upon receiving a request from the first instance of the application to access a second network, checking whether the application has permission to access the second network, the checking based, at least in part, on the safety of concurrent access to the first network and the second network;

informing the application of the result of the permission checking;

if access is granted but concurrent access is denied, generating a second instance of the application in association with the second network;

associating a second routing table with the second network;

defining a second set of interfaces, through which the second instance of the application exchanges a plurality of data packets with the second network;

associating the second set of interfaces with the second network; and associating a second virtual network stack with the second network for managing the data packets transferred between the second network and the second set of interfaces.

3. The method of claim 1, further comprising:

if access is granted but concurrent access is denied, moving the first instance of the application from associating with the first network to associating with the second network.

4. A method operable in a computer system having access to a plurality of networks, for managing an application instance's concurrent access to the networks, the method comprising:

associating a first instance of the application with a first network;

upon receiving a request from the first instance of the application to access a second network, checking whether the application has permission to access the second network, the checking based, at least in part, on the safety of concurrent access to the first network and the second network;

informing the application of the result of the permission checking upon receiving a request from the first instance of the application to create a connection to a third network, checking whether the application has permission to create the connection, the checking based, at least in part, on the safety of concurrent access to the first network and the third network;

informing the application of the result of the permission checking;

if the permission is granted, creating the connection to the third network;

if access is granted but concurrent access is denied, generating a third instance of the application in association with the third network;

associating a third routing table with the third network;

defining a third set of interfaces, through which the third instance of the application exchanges a plurality of data packets with the third network;

associating the third set of interfaces with the third network; and associating a third virtual network stack with the third network for managing the data packets transferred between the third network and the third set of interfaces.

5. The method of claim 4 further comprising:

if access is granted but concurrent is denied, moving the first instance of the application from associating with the first network to associating with the third network.

6. A computer storage medium having computer-readable instructions for performing the method of claim 1.

7. A computer management facility supporting a plurality of applications running on virtual machines connected to a multiplicity of resource sets, the management facility comprising:

a persistent storage module for storing a record, the record comprising, for each principal, an indication of whether the principal has permission to access each of the resource sets, and an indication of whether the principal has permission to concurrently access a combination of two or more resource sets;

a device driver connected to the applications and the persistent storage module, wherein the device driver, upon receiving a request from an application instance to access a resource in a set connected to a second virtual machine different from a first virtual machine to which the application instance is assigned, checks the persistent storage module to see if the principal owning the application instance has permission to access the resource, the checking based, at least in part, on the safety of concurrent access to the first virtual machine and the second virtual machine;

a virtual machine launching module connected to the device driver and the persistent storage module for launching a new virtual machine and updating the record of the persistent storage module, wherein the storage module, device driver and virtual machine launching module cooperate to associate a first routing table with the first virtual machine, define a first set of interfaces, through which the instance of the application exchanges a plurality of data packets with the first virtual machine, associate the first set of interfaces with the first virtual machine and associate a first virtual machine stack with the first virtual machine for managing the data packets transferred between the first virtual machine and the first set of interfaces.

8. The management facility of claim 7 wherein the device driver is adapted for, upon receiving a request from an application instance to access a resource set connected to the second virtual machine different from the first virtual machine to which the application instance is assigned, moving the application instance to the second virtual machine if the application instance does not have permission to concurrently access multiple resource sets.

9. The management facility of claim 7 wherein the device driver is adapted for, upon receiving a request from a first application instance to access a resource set connected to the second virtual machine different from the first virtual machine to which the first application instance is assigned, creating a second application instance in the second virtual machine if the first application instance does not have permission to concurrently access multiple resource sets.

10. The management facility of claim 7, wherein the virtual machine launching module further comprises:

a desktop launching module for generating a new desktop in the new virtual machine, wherein the new desktop is adapted for supporting on-screen working areas from which the instance of the application is launched.

* * * * *